United States Patent
Ogata et al.

(10) Patent No.: US 7,751,286 B2
(45) Date of Patent: Jul. 6, 2010

(54) OPTICAL PICKUP UNIT AND INFORMATION RECORDING APPARATUS USING THE SAME

(75) Inventors: Tetsuya Ogata, Kanagawa (JP); Tatsuo Mikami, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 944 days.

(21) Appl. No.: 11/453,066

(22) Filed: Jun. 15, 2006

(65) Prior Publication Data

US 2006/0227679 A1    Oct. 12, 2006

Related U.S. Application Data

(63) Continuation of application No. PCT/JP2005/019153, filed on Oct. 12, 2005.

(30) Foreign Application Priority Data

Oct. 18, 2004  (JP)  .............. 2004-302662
Mar. 8, 2005   (JP)  .............. 2005-063861

(51) Int. Cl.
*G11B 7/09*  (2006.01)

(52) U.S. Cl. ................ 369/44.41; 369/44.32

(58) Field of Classification Search .......... 369/44.41, 369/44.32, 112.01, 53.14, 53.19, 275.1, 275.4

See application file for complete search history.

(56) References Cited

U.S. PATENT DOCUMENTS

| | | | |
|---|---|---|---|
| 6,219,316 B1 | 4/2001 | Buechler et al. | |
| 6,829,205 B2 * | 12/2004 | Fukumoto | 369/53.14 |
| 7,227,819 B2 * | 6/2007 | Kadowaki et al. | 369/44.41 |
| 2002/0054548 A1 * | 5/2002 | Tateishi | 369/44.27 |
| 2002/0071364 A1 * | 6/2002 | Yanagawa et al. | 369/53.19 |
| 2002/0181343 A1 * | 12/2002 | Hayashi et al. | 369/44.23 |
| 2003/0090970 A1 | 5/2003 | Watanabe et al. | |

(Continued)

FOREIGN PATENT DOCUMENTS

EP    1 391 884 A2    2/2004

(Continued)

OTHER PUBLICATIONS

Extended European Search Report dated Jul. 23, 2008 issued in PCT/JP2005/019153.

*Primary Examiner*—Tan X Dinh
*Assistant Examiner*—Kim-Kwok Chu
(74) *Attorney, Agent, or Firm*—Dickstein Shapiro LLP

(57) ABSTRACT

An optical pickup unit for recording information on and/or reproducing information from a multilayer information recording medium including multiple recording surfaces in each of which a guide groove on which the information is to be recorded is spirally formed is disclosed. The optical pickup unit includes a light source, a diffraction element configured to split the light beam emitted from the light source into a main light beam and first and second sub light beams, an objective lens for focusing the main and sub light beams onto a recording surface of the multilayer information recording medium, and multiple light receiving elements each divided into light receiving parts so as to receive the main and sub light beams reflected from the recording surface. The focused first and second sub light beams are disposed at respective positions at least 3/2 tracks away from the focused main light beam on the recording surface.

16 Claims, 10 Drawing Sheets

U.S. PATENT DOCUMENTS

| | | |
|---|---|---|
| 2003/0214898 A1 | 11/2003 | Ogata et al. |
| 2004/0156294 A1* | 8/2004 | Watanabe et al. ............. 369/94 |
| 2005/0122879 A1 | 6/2005 | Hirai et al. |
| 2005/0174918 A1 | 8/2005 | Ogata |
| 2005/0199778 A1* | 9/2005 | Kadowaki et al. ........ 250/201.5 |

FOREIGN PATENT DOCUMENTS

| | | |
|---|---|---|
| JP | 7-110956 A | 4/1995 |
| JP | 10-198972 A | 7/1998 |
| JP | 2000-331356 A | 11/2000 |
| JP | 2001-307351 A | 11/2001 |
| JP | 2002-15442 A | 1/2002 |
| JP | 2002-230805 A | 8/2002 |
| JP | 2003-162832 | 6/2003 |
| JP | 2003-196860 A | 7/2003 |
| JP | 2004-164720 A | 6/2004 |
| WO | WO-02/49022 A1 | 6/2002 |

* cited by examiner

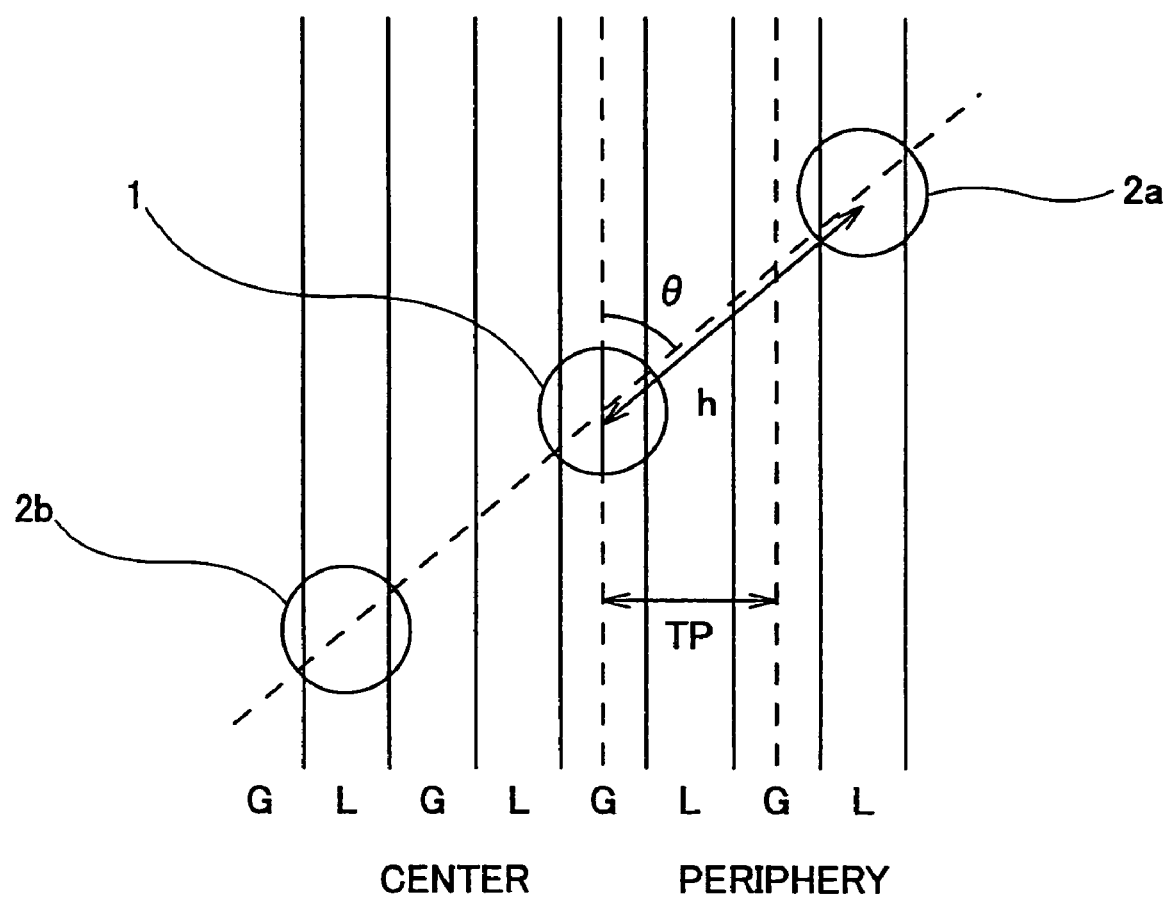

OPTICAL PICKUP UNIT AND INFORMATION RECORDING APPARATUS USING THE SAME

CROSS-REFERENCE TO RELATED APPLICATION

The present application is a U.S. continuation application filed under 35 U.S.C. 111(a) claiming benefit under 35 U.S.C. 120 and 365(c) of PCT International Application No. PCT/JP2005/019153, filed on Oct. 12, 2005, which claims priority to Japanese Priority Patent Applications No. 2004-302662, filed on Oct. 18, 2004, and No. 2005-063861, filed on Mar. 8, 2005. The entire contents of the foregoing applications are hereby incorporated by reference.

BACKGROUND OF THE INVENTION

1. Field of the Invention

The present invention relates generally to optical pickup units and information recording apparatuses, and more particularly to an optical pickup unit recording information on and reproducing information from the recording surface of a multilayer information recording medium using the differential push-pull method detecting and controlling the position of an emitted light beam, and an information recording apparatus using the same.

2. Description of the Related Art

In information recording apparatuses, a main light beam is emitted from a light source onto the recording surface of an information recording medium having guide grooves (information tracks) on which the information is recorded, so that information is recorded on the information recording medium or information is reproduced from the information recording medium based on light reflected from the recording surface. The information recording apparatus includes an optical pickup unit for emitting the main light beam on the recording surface of the information recording medium and receiving light reflected from the recording surface.

Further, as shown in FIG. 1, the optical pickup unit includes a light source 11, an optical system including an objective lens 16, and a divided light receiving element 19. The optical system further includes a coupling lens 12, a beam splitter 14, and a deflection mirror 15. The optical system guides a light beam emitted from the light source 11 to the recording surface of an information recording medium 18 and guides a returning light beam reflected from the recording surface to a predetermined light-receiving position, where the divided light receiving element 19 is disposed. The divided light receiving element 19 outputs not only the reproduced information of data recorded on the recording surface but also signals including information necessary for controlling the positions of the optical pickup unit itself and the objective lens 16. These signals are fed back so as to control their positions, so that driving control is performed by a lens actuator 17.

In order to accurately record data at a predetermined position on the recording surface and reproduce data recorded at a predetermined position on the recording surface, a main light beam should be emitted accurately onto the predetermined position of the recording surface. This makes it necessary to detect the position of the emitted main light beam with accuracy. As a result, there have been proposed various methods for detecting the position of the emitted main light beam on the recording surface using a returning light beam reflected from the recording surface, some of which have been put to practical use.

As a method of detecting the position of the main light beam on the recording surface from a returning light beam reflected from the recording surface, a so-called push-pull method is widely used.

As shown in FIG. 2, according to the push-pull method, a light beam emitted from a light source is split into one main light beam 1 and two sub light beams 2, so that the main light beam 1 and each of the sub light beams 2 are offset from each other radially on the recording surface by half a track pitch. The returning light beams of the main light beam 1 and the two sub light beams 2 reflected from the recording surface are received by three divided light receiving elements 19a through 19c, respectively, shown in FIG. 3. Each of the divided light receiving elements 19a through 19c is divided into two parts. A push-pull signal is obtained from each of the divided light receiving elements 19a through 19c. A tracking error signal (DPP) of Eq. (1) is obtained from the difference between the push-pull signal of the main light beam 1 (MPP) and the sum of the sub push-pull signals of the two sub light beams 2 (SPP) as follows:

$$DPP = MPP - K(SPP), \qquad (1)$$

where K is an integer. Based on the thus detected tracking error signal, so-called tracking control that drives the objective lens in the radial directions of the information recording medium is performed.

At the time of recording information on the information recording medium, the reflectivity of the guide grooves varies. Therefore, as shown in FIG. 4A, in recording information on the information recording medium in a direction from the center to the periphery thereof, disposing a first sub light beam 2a and a second sub light beam 2b so that the first sub light beam 2a leads the main light beam 1 on its inner side and the second sub light beam 2b trails the main light beam 1 on its outer side in the optical disk scanning direction causes an offset in the differential push-pull signal due to the difference in reflectivity between an unrecorded part 4 and a recorded part 5. Therefore, according to Japanese Laid-Open Patent Application No. 2004-164720, as shown in FIG. 4B, the first and second sub light beams 2a and 2b are disposed so that the first sub light beam 2a leads the main light beam 1 on its outer side and the second sub light beam 2b trails the main light beam 1 on its inner side in the optical disk scanning direction, thereby eliminating the effect of the difference in reflectivity in each of the first and second sub light beams 2a and 2b and thus reducing an offset in the differential push-pull signal.

Multilayer information recording media are employed as means for increasing the capacity of information recording media. Of the multilayer information recording media, those put to practical use at present include DVD+R double layer (DL) disks and DVD-ROM double layer (DL) disks.

FIG. 5 shows a structure of the DVD+R DL disk. Referring to FIG. 5, the DVD+R DL disk includes a substrate 0 layer, a dye 0 layer, a translucent film, an intermediate layer, a dye 1 layer, a reflection film, and a substrate 1 layer that are stacked in the order described from the light incidence (objective lens) side.

Signal information is recorded as variations in refractive index on a guide groove from the dye 0 layer to the dye 1 layer. In general, polycarbonate may be used for the substrate 0 layer and the substrate 1 layer, and a UV cure or thermosetting resin may be used for the intermediate layer. Silicon, silver, or aluminum may be used for the translucent film, and silver or aluminum may be used for the reflection film.

The guide groove is formed spirally on each recording surface. The direction of the spiral differs between an L0 layer on the objective lens side and an L1 layer on the other side of the L0 layer from the objective lens. This structure where the direction of the spiral of the guide groove differs between the L0 layer and the L1 layer is referred to as "Opposite Track Path (OTP)."

In an OTP double layer disk, information is recorded in a direction from the center to the periphery of the disk on the L0 layer and in the opposite direction, from the periphery to the center, on the L1 layer.

For related techniques, reference may be made to Japanese Laid-Open Patent Application Nos. 2003-196860 and 2002-015442.

FIG. 6A shows a conventional disposition of the main light beam 1 and the sub light beams 2a and 2b in the case of recording information on the DVD+R DL disk. In recording information in the L0 layer, an excellent push-pull signal can be obtained with the above-described technique disclosed in Japanese Laid-Open Patent Application No. 2004-164720 since there is no difference in reflectivity in each of the sub light beams 2a and 2b.

However, in recording information in the L1 layer, in which information is recorded in a direction from the periphery to the center of the disk, the area of the recorded part 5 is reversed as shown in FIG. 6B. As a result, a difference in reflectivity is caused in each of the sub light beams 2a and 2b, so that an offset is caused in the push-pull signal. That is, in the case of recording information on a multilayer information recording medium having an OTP structure, the technique of Japanese Laid-Open Patent Application No. 2004-164720 has a problem in that an offset is caused in one of the recording layers of the recording medium.

SUMMARY OF THE INVENTION

Accordingly, it is a general object of the present invention to provide an optical pickup unit in which the above-described disadvantage is eliminated.

A more specific object of the present invention is to provide an optical pickup unit capable of obtaining excellent sub light beam signals from a multilayer information recording medium in which the direction of the spiral of a guide groove is different on each recording surface, and recording information on and reproducing information from the recording medium using stable signals such as a differential push-pull signal and a lens position signal obtained from the excellent sub light beam signals.

Another more specific object of the present invention is to provide an information recording apparatus using the optical pickup unit.

One or more of the above objects of the present invention are achieved by an optical pickup unit for recording information on and/or reproducing information from a multilayer information recording medium including a plurality of recording surfaces in each of which a guide groove serving as an information track on which the information is to be recorded is spirally formed, wherein a direction of a spiral of the guide groove alternates between the recording surfaces, the optical pickup unit including: a light source emitting a light beam; a diffraction element configured to split the light beam emitted from the light source into a main light beam and first and second sub light beams; an objective lens for focusing the main light beam and the first and second sub light beams onto one of the recording surfaces of the multilayer information recording medium; and a plurality of light receiving elements each divided into a plurality of light receiving parts shaped in any manner so as to receive the main light beam and the first and second sub light beams reflected from the one of the recording surfaces, wherein the focused first and second sub light beams are disposed at respective positions at least 3/2 tracks away from the focused main light beam on the one of the recording surfaces.

According to one aspect of the present invention, each sub light beam is disposed in the area of a recorded part where information has been recorded by a main light beam or in the area of an unrecorded part on a recording surface of a multilayer information recording medium. Accordingly, it is possible to obtain an excellent signal without a difference in reflectivity in each sub light beam.

One or more of the above objects of the present invention are also achieved by an information recording apparatus including an optical pickup unit according to the present invention; a signal processing part configured to generate, based on signals from the light receiving elements of the optical pickup unit, a main push-pull signal, which is a tracking error signal of the main light beam, a first tracking error signal of the first sub light beam, and a second tracking error signal of the second sub light beam; generate a sub push-pull signal by calculating a sum of the first and second tracking error signals; and generate a differential push-pull signal by calculating a difference between the main push-pull signal and the sub push-pull signal multiplied by a correction factor; a track controller configured to control the objective lens in a track direction based on the differential push-pull signal; and a driver configured to drive the objective lens.

According to one aspect of the present invention, tracking control can be performed stably on each recording surface of a multilayer information recording medium in which the direction of the spiral of a guide groove is different in each recording surface.

One or more of the above objects of the present invention are also achieved by an information recording apparatus including: an optical pickup unit according to the present invention; a signal processing part configured to generate, based on signals from the light receiving elements of the optical pickup unit, a main push-pull signal, which is a tracking error signal of the main light beam, a first tracking error signal of the first sub light beam, and a second tracking error signal of the second sub light beam; generate a sub push-pull signal by calculating a sum of the first and second tracking error signals; and generate a lens position signal by calculating a sum of the main push-pull signal and the sub push-pull signal multiplied by a correction factor; a lens controller configured to correct a shifting of the objective lens based on the lens position signal; and a driver configured to drive the objective lens.

According to one aspect of the present invention, with respect to a multilayer information recording medium in which the direction of the spiral of a guide groove is different in each recording surface, it is possible to control the position of an objective lens at the time of a high-speed seek operation with respect to each recording surface.

According to one aspect of the present invention, with respect to a multilayer information recording medium in which the direction of the spiral of a groove is different in each of its recording surfaces, excellent sub light beam signals may be obtained with respect to each recording surface. Further, an excellent differential push-pull signal, lens position signal, and track cross signal without an offset may be obtained with respect to each recording surface during recording even if there is a difference in reflectivity between an unrecorded part and a recorded part. As a result, it is possible to perform excellent control of the position of an objective lens so that information can be stably recorded on and reproduced from the multilayer information recording medium with accuracy.

BRIEF DESCRIPTION OF THE DRAWINGS

Other objects, features and advantages of the present invention will become more apparent from the following detailed description when read in conjunction with the accompanying drawings, in which:

FIG. 8 is a diagram for illustrating the positional relationship between the main light beam and the sub light beams according to the first embodiment of the present invention;

DETAILED DESCRIPTION OF THE PREFERRED EMBODIMENTS

Figure 1:
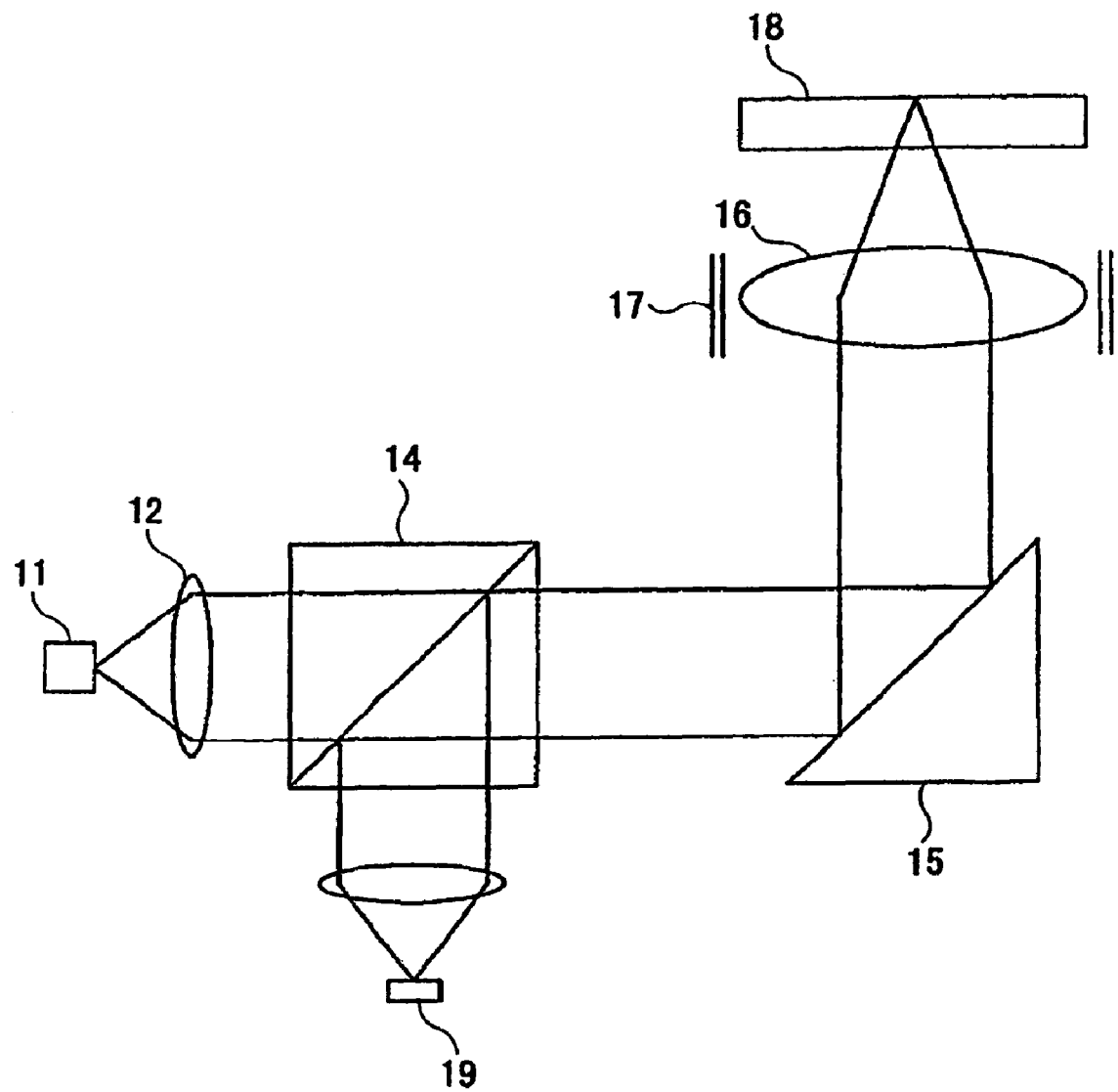
FIG. 1 is a schematic diagram showing a conventional optical pickup unit.
Figure 2:
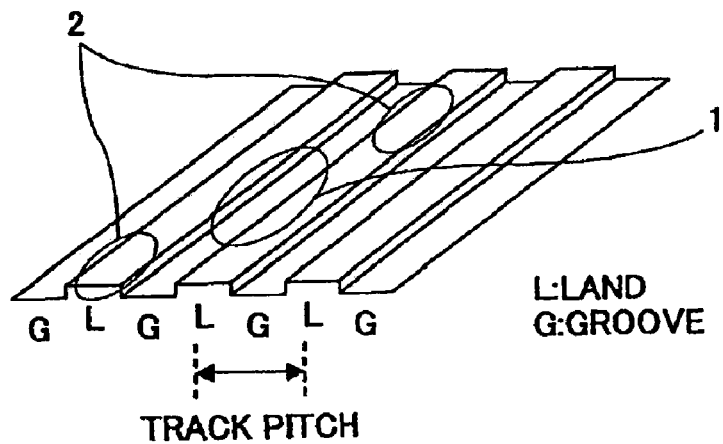
FIG. 2 is a diagram showing a conventional disposition of a main light beam and sub light beams focused onto a recording surface.
Figure 3:
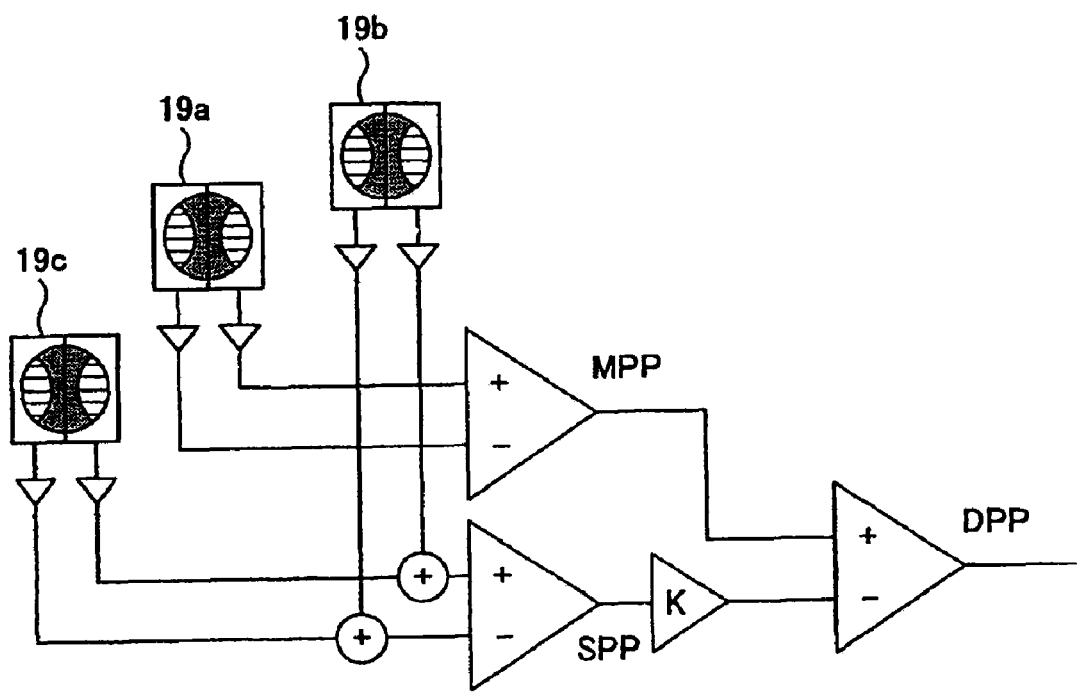
FIG. 3 is a circuit diagram showing three light receiving elements each divided in two parts for receiving the main light beam and the sub light beams shown in FIG. 2 and a signal calculator.
Figure 4A:
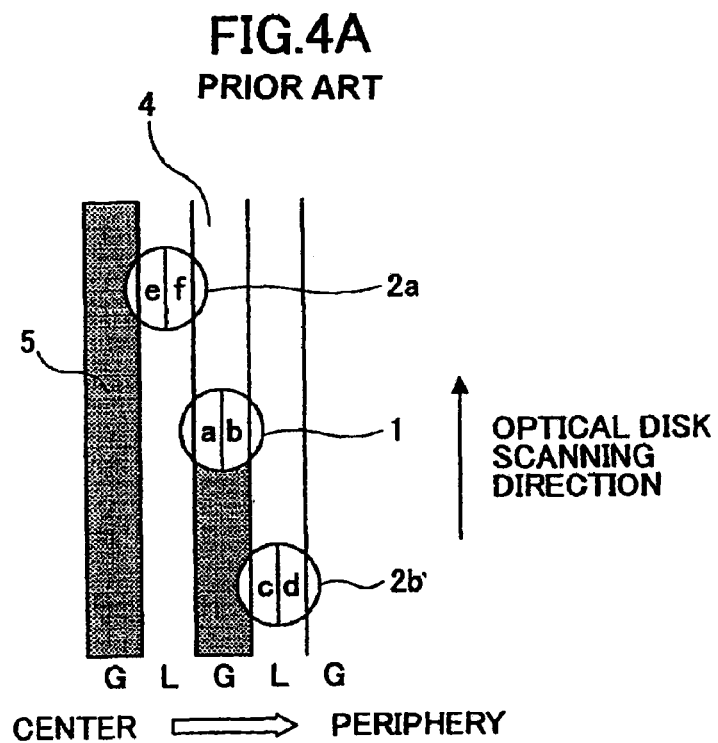
FIGS. 4A and 4B are diagrams each showing a conventional disposition of the main light beam and the sub light beams focused onto the recording surface of an information recording medium.
Figure 4B:
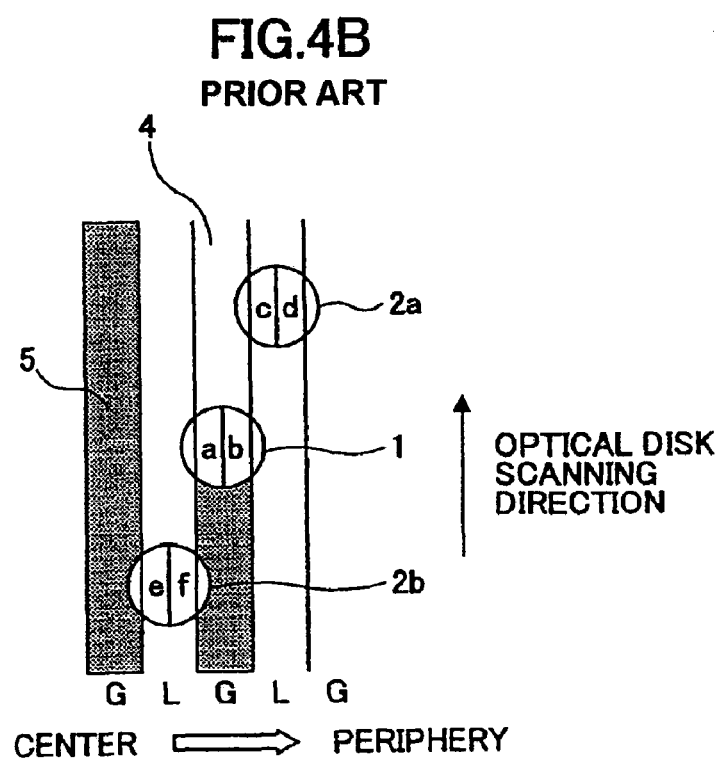

A description is given, with reference to the accompanying drawings, of embodiments of the present invention.

In the following, a double layer disk having two recording surfaces is taken as an example of the multilayer information recording medium for simplification of description. However, the present invention is not limited to the double layer disk. Further, in the drawings, the same elements as those described above are referred to by the same numerals, and a description thereof is omitted.

Figure 5:
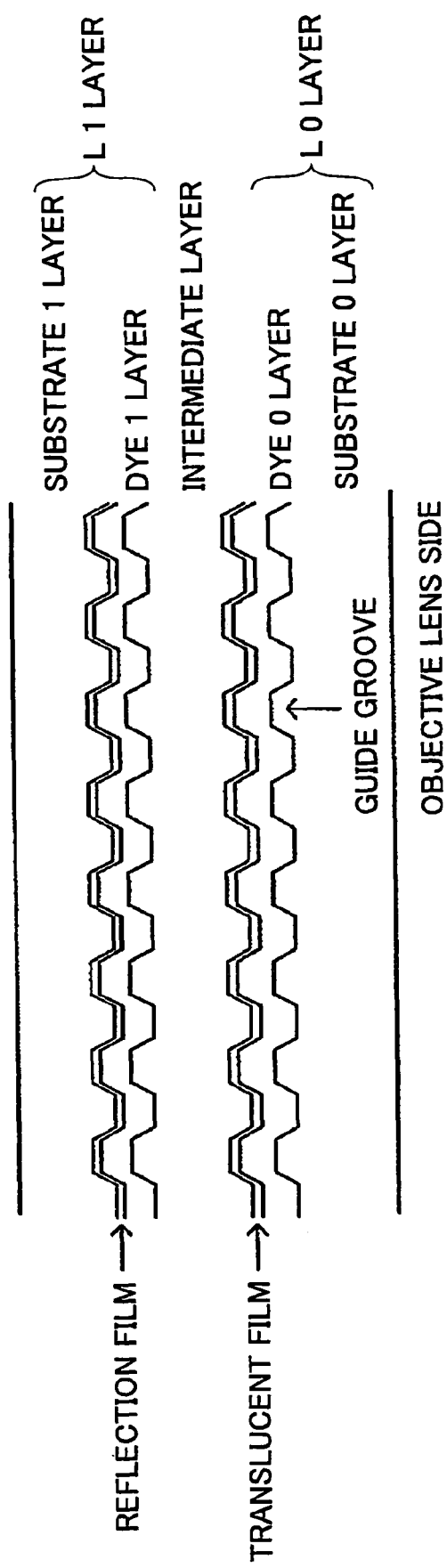
FIG. 5 is a diagram showing a structure of a multilayer information recording medium (double layer disk)
Figure 7A:
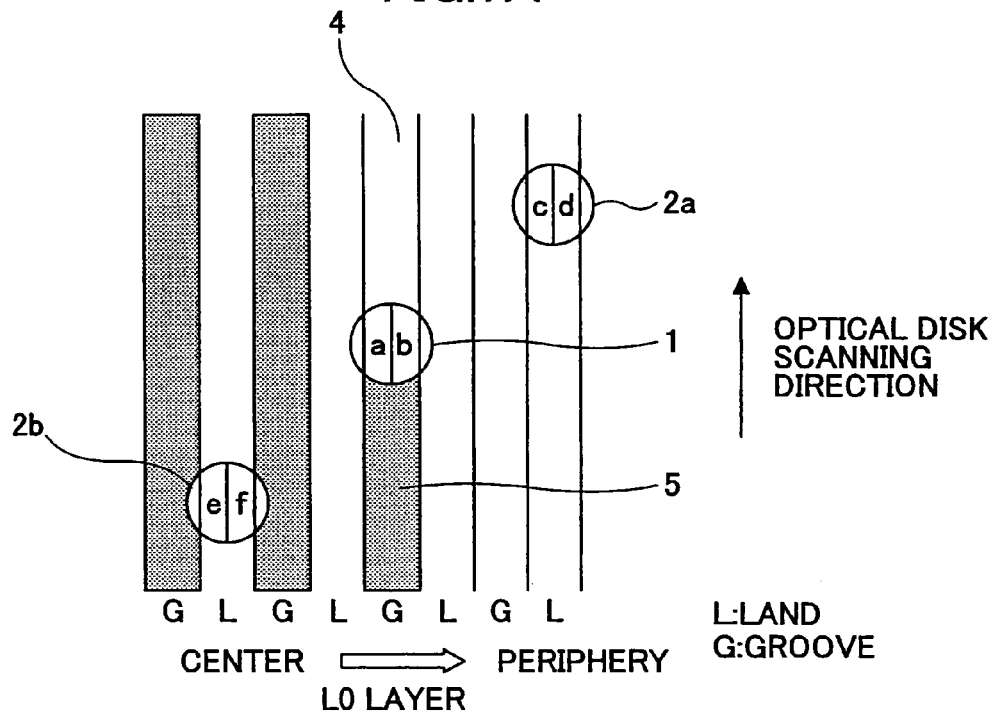
FIGS. 7A and 7B are diagrams each showing a disposition of the main light beam and the sub light beams focused onto a recording surface of the multilayer information recording medium (double layer disk) according to a first embodiment of the present invention.
Figure 7B:
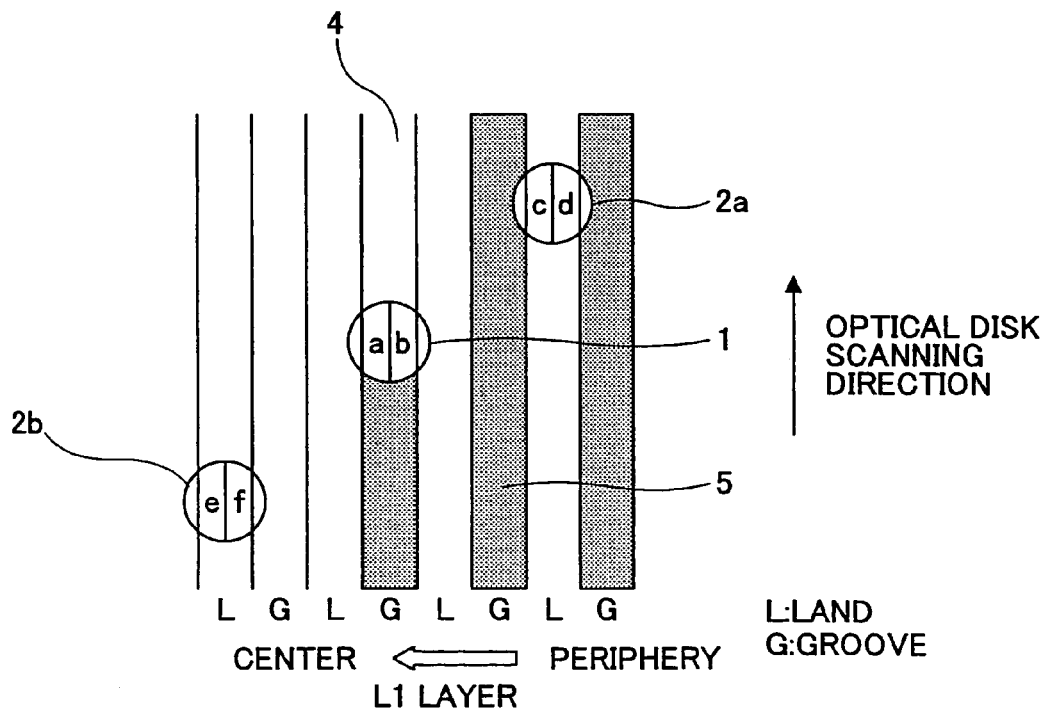

FIGS. 7A and 7B are diagrams each showing a disposition of the main light beam 1 and the sub light beams 2a and 2b focused onto a recording surface of a multilayer information recording medium (a double layer disk) according to a first embodiment of the present invention. FIG. 7A shows a state where each of the beams 1, 2a, and 2b is focused onto the recording surface (L0 layer, FIG. 5) on the objective lens side. In FIG. 7A, information is recorded on the recording surface in a direction from the center to the periphery of the disk. The double layer disk rotates about the disk center. In FIG. 7A, the double layer disk rotates clockwise so that the recording surface is scanned counterclockwise by the beams 1, 2a, and 2b. Accordingly, data is recorded (the recorded part 5 is formed) on the center (inner) side and the trailing (rear) side of the main light beam 1 in the optical disk scanning direction. The data is recorded on a groove. Therefore, the main light beam 1 is focused into a spot on the groove.

According to the first embodiment, the sub light beams 2a and 2b are focused into spots on corresponding lands that are 3/2 tracks (track pitches) or more away from the main light beam 1 on the periphery (outer) side and the center (inner) side, respectively, of the main light beam 1.

The sub light beams 2a and 2b are disposed at such positions, so that the first sub light beam 2a detects the diffracted light of a groove of the unrecorded part 4 equally on its right (periphery) side and on its left (center) side and the second sub light beam 2b detects the diffracted light of a groove of the recorded part 5 equally on its right (periphery) side and on its left (center) side. As a result, an excellent signal is obtained in each of the sub light beams 2a and 2b without being affected by the difference in reflectivity between the unrecorded part 4 and the recorded part 5.

FIG. 7B shows a state where each of the beams 1, 2a, and 2b is focused onto the recording surface (L1 layer, FIG. 5) on the far side from the objective lens. In FIG. 7B, information is recorded on the recording surface in a direction from the periphery to the center of the disk. As described above, the double layer disk rotates about the disk center. In FIG. 7B, the double layer disk rotates clockwise so that the recording surface is scanned counterclockwise by the beams 1, 2a, and 2b. Accordingly, data is recorded (the recorded part 5 is formed) on the periphery (outer) side and the trailing (rear) side of the main light beam 1 in the optical disk scanning direction.

In recording information in the L1 layer, the first sub light beam 2a detects the diffracted light of a groove of the recorded part 5 equally on its right (periphery) side and on its left (center) side and the second sub light beam 2b detects the diffracted light of a groove of the unrecorded part 4 equally on its right (periphery) side and on its left (center) side. As a result, an excellent signal is obtained in each of the sub light beams 2a and 2b without being affected by the difference in reflectivity between the unrecorded part 4 and the recorded part 5.

According to the first embodiment, the first sub light beam 2a is disposed ahead of the main light beam 1 on its periphery (outer) side and the second sub light beam 2b is disposed behind the main light beam 1 on its center (inner) side in the optical disk scanning direction. Alternatively, the first sub light beam 2a may be disposed behind the main light beam 1 on its periphery (outer) side and the second sub light beam 2b may be disposed ahead of the main light beam 1 on its center (inner) side in the optical disk scanning direction as long as each of the sub light beams 2a and 2b is 3/2 tracks or more away from the main light beam 1.

A description is given in more detail of this first embodiment with reference to FIG. 8. Referring to FIG. 8, letting the distance between the main light beam 1 and the first sub light beam 2a (or the second sub light beam 2b) focused onto the recording surface, the angle formed by an information track and a straight line connecting the main light beam 1 and the first sub light beam 2a (or the second sub light beam 2b) focused onto the recording surface, and a track pitch (the radial distance between guide grooves of an information recording medium) be h, θ, and TP, respectively, the main light beam 1 and the sub light beams 2a and 2b are disposed so as to satisfy the following:

$$h\sin\theta \geq \left(n + \frac{1}{2}\right) \times TP, \quad (2)$$

where n is an integer greater than or equal to one.

Specifically, in the case of recording information on and reproducing information from a DVD+R DL disk, the beams 1, 2a, and 2b may be disposed so as to satisfy the following:

$$h\sin\theta \geq \left(n + \frac{1}{2}\right) \times 0.74(\mu m). \quad (3)$$

This makes it possible to obtain an excellent signal without a difference in reflectivity in each of the sub light beams 2a and 2b with respect to the DVD+R (or DVD-R) multilayer disk, whose track pitch is 0.74 μm.

Further, in the case of recording information on and reproducing information from a Blu-ray double layer disk, the beams 1, 2a, and 2b may be disposed so as to satisfy the following:

$$h\sin\theta \geq \left(n + \frac{1}{2}\right) \times 0.35(\mu m). \quad (4)$$

This makes it possible to obtain an excellent signal without a difference in reflectivity in each of the sub light beams 2a and 2b with respect to the Blu-ray multilayer disk, whose track pitch is 0.35 μm.

In general, a signal is likely to be disturbed in the proximity of the periphery of an information recording medium because of the effect of warping of its substrate and the effect of double refraction. Accordingly, it is preferable that a sub light beam be positioned as close to a main light beam as possible on a land that is 3/2 tracks or more away from the main light beam.

An excellent signal can be obtained by positioning each sub light beam on a land that is 3/2 tracks or more away from the main light beam.

Accordingly, it is preferable that each of the sub light beams 2a and 2b be disposed on the recording surface so as to satisfy the following:

$$h\sin\theta = \frac{3}{2} \times TP. \quad (5)$$

This makes it possible to tolerate a track error in the innermost part and the outermost part of the multilayer information recording medium.

At this point, with respect to the DVD+R DL disk, the position of each of the sub light beams 2a and 2b is set so as to satisfy the following:

$$h \sin \theta = 1.11(\mu m). \quad (6)$$

This makes it possible to obtain an excellent signal without a difference in reflectivity in each of the sub light beams 2a and 2b with respect to the DVD+R (or DVD-R) multilayer disk, whose track pitch is 0.74 μm, and to tolerate a track error in the innermost part and the outermost part of the multilayer DVD+R (or DVD-R) disk.

Further, with respect to the Blu-ray double layer disk, the position of each of the sub light beams 2a and 2b is set so as to satisfy the following:

$$h \sin \theta = 0.525(\mu m). \quad (7)$$

This makes it possible to obtain an excellent signal without a difference in reflectivity in each of the sub light beams 2a and 2b with respect to the Blu-ray multilayer disk, whose track pitch is 0.35 μm, and to tolerate a track error in the innermost part and the outermost part of the multilayer Blu-ray disk.

Figure 9:
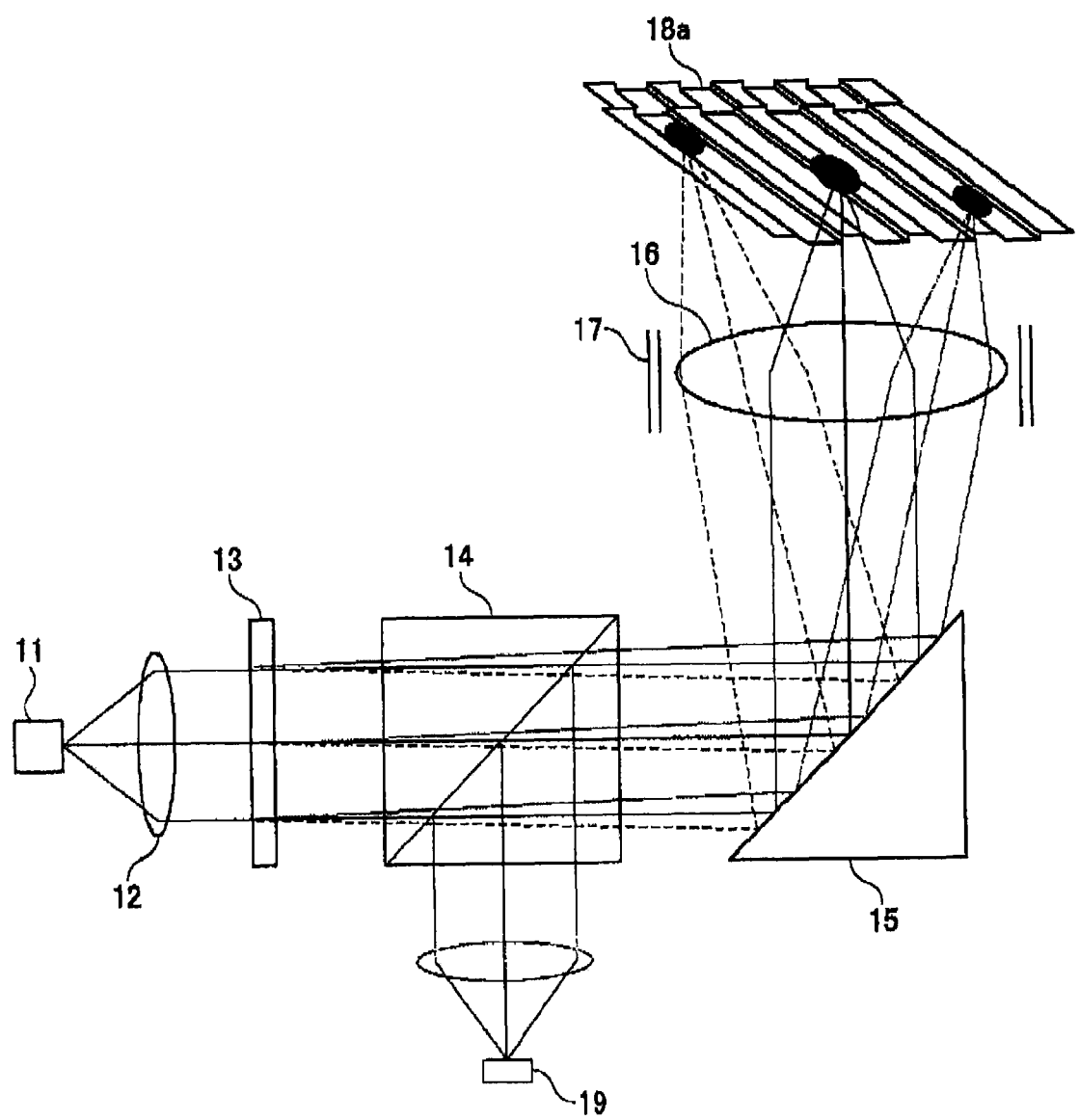
FIG. 9 is a schematic diagram showing an optical pickup unit according to the first embodiment of the present invention.

FIG. 9 is a schematic diagram showing an optical pickup unit according to the first embodiment. In addition to the configuration of FIG. 1, the optical pickup unit of FIG. 9 further includes a diffraction element 13. A light beam emitted from the light source 11 is split into the zero-order main light beam 1 and the positive and negative first-order first and second sub light beams 2a and 2b by the diffraction element 13. Each of the light beams 1, 2a, and 2b is focused onto a recording surface of a double layer disk (a multilayer information recording medium) 18a by the objective lens 16. Each of the light beams 1, 2a, and 2b reflected from the recording surface has its optical path changed by the beam splitter 14 so as to be detected by the divided light receiving element 19.

The position of each of the focused sub light beams 2a and 2b on the recording surface is controlled by turning the diffraction element 13 relative to a principal plane.

Figure 10:
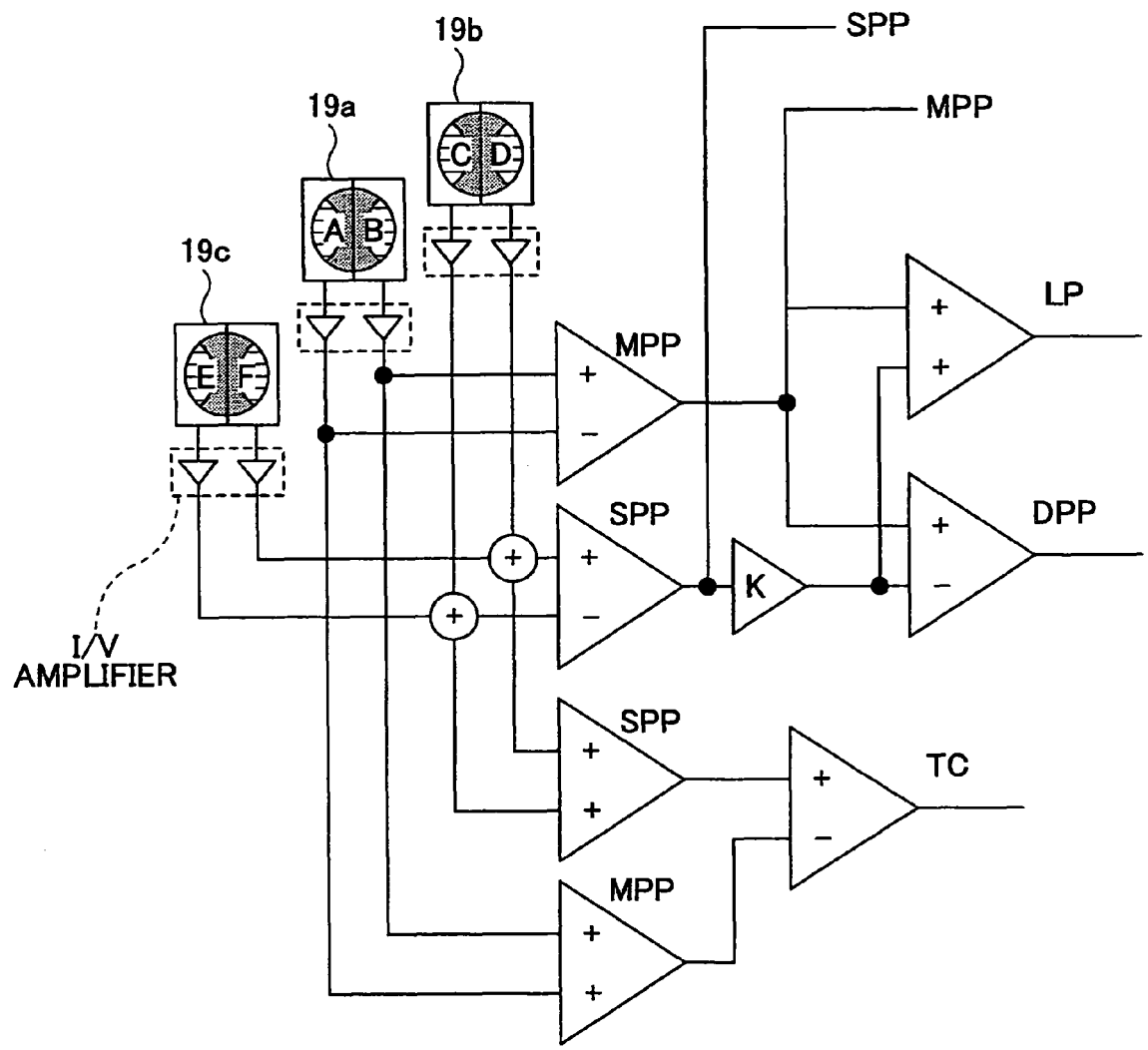
FIG. 10 is a circuit diagram showing the three light receiving elements each divided in two parts for receiving the main light beam and the sub light beams and a signal calculator according to the first embodiment of the present invention.

The main light beam 1 and the sub light beams 2a and 2b reflected from the recording surface are detected by the divided light receiving element 19. FIG. 10 shows a configuration of the divided light receiving element 19. Referring to FIG. 10, the divided light receiving element 19 includes the three light receiving elements 19a through 19c, each divided into multiple parts shaped in any manner, that is, having a light receiving surface thereof divided into two parts, for receiving the main light beam, the first sub light beam, and the second sub light beam, respectively.

The light receiving surface of the light receiving elements 19a is divided into two parts A and B, which detect the portions a and b, respectively, of the main light beam 1 focused onto the recording surface as shown in FIGS. 7A and 7B. The light receiving surface of the light receiving elements 19b is divided into two parts C and D, which detect the portions c and d, respectively, of the first sub light beam 2a focused onto the recording surface as shown in FIGS. 7A and 7B. The light receiving surface of the light receiving elements 19c is divided into two parts E and F, which detect the portions e and f, respectively, of the second sub light beam 2b focused onto the recording surface as shown in FIGS. 7A and 7B.

A main push-pull signal (MPP) is obtained by calculating the difference between the right and left signals in the main light beam 1 as follows:

$$MPP = \frac{(A - B)}{(A + B)}. \quad (8)$$

A first sub push-pull signal (SPP1) is obtained by calculating the difference between the right and left signals in the first sub light beam 2a as follows:

$$SPP1 = \frac{(C-D)}{(C+D)}. \quad (9)$$

A second sub push-pull signal (SPP2) is obtained by calculating the difference between the right and left signals in the second sub light beam 2b as follows:

$$SPP2 = \frac{(E-F)}{(E+F)}. \quad (10)$$

A sub push-pull signal (SPP) is obtained by calculating the sum of the first sub push-pull signal (SPP1) and the second sub push-pull signal (SPP2) as follows:

SPP=SPP1+SPP2. (11)

A differential push-pull signal (DPP) is obtained by calculating the difference between the main push-pull signal (MPP) and the sub push-pull signal (SPP) multiplied by a correction factor K as follows:

DPP=MPP−K×SPP, (12)

where K is an integer.

Here, MPP and SPP are different in phase by 180°, and an offset due to optical axis displacement is caused in the same positive or negative direction in MPP and SPP. Accordingly, by setting the value of K to the ratio of light quantity of the main light beam 1 to the sub light beams 2a and 2b, MPP matches SPP in amplitude, so that the offset of the push-pull method due to optical axis displacement is totally canceled. This makes it possible to perform stable tracking control.

Further, as shown in FIG. 7A, for example, the reflectivity of the second sub light beam 2b is increased because of the recorded part 5 on the recording surface in the L0 layer. Letting the rate of increase of reflectivity at this point be r, first and second sub push-pull signals SPP1' and SPP2' at this point are given as follows:

$$SPP1' = \frac{(C-D)}{(C+D)} = SPP1, \text{ and} \quad (13)$$

$$SPP2' = \frac{(rE-rF)}{(rE+rF)} = \frac{(E-F)}{(E+F)} = SPP2.$$

Accordingly, in the case where the main light beam 1 is focused into a spot on the center of a groove and each of the sub light beams 2a and 2b is focused into a spot on the center of a corresponding land on the recording surface of the double layer disk, the following equation holds.

MPP'=SPP1'=SPP2'=DPP=0, (14)

where MPP' is a main push-pull signal corresponding to SPP1' and SPP2'.

Thus, no offset is caused during recording, so that an excellent differential push-pull signal is obtained.

Likewise, in the L1 layer, the reflectivity of the first sub light beam 2a is also increased because of the recorded part 5 on the recording surface. Letting the rate of increase of reflectivity at this point be r, SPP1' and SPP2' are given as follows:

$$SPP1' = \frac{(rC-rD)}{(rC+rD)} = \frac{(C-D)}{(C+D)} SPP1, \text{ and} \quad (15)$$

$$SPP2' = \frac{(E-F)}{(E+F)} = SPP2.$$

Accordingly, in the case where the main light beam 1 is focused into a spot on the center of a groove and each of the sub light beams 2a and 2b is focused into a spot on the center of a corresponding land on the recording surface of the double layer disk, the following equation holds.

MPP'=SPP1'=SPP2'=DPP=0. (16)

Thus, no offset is caused during recording, so that an excellent differential push-pull signal is obtained.

Figure 6A:
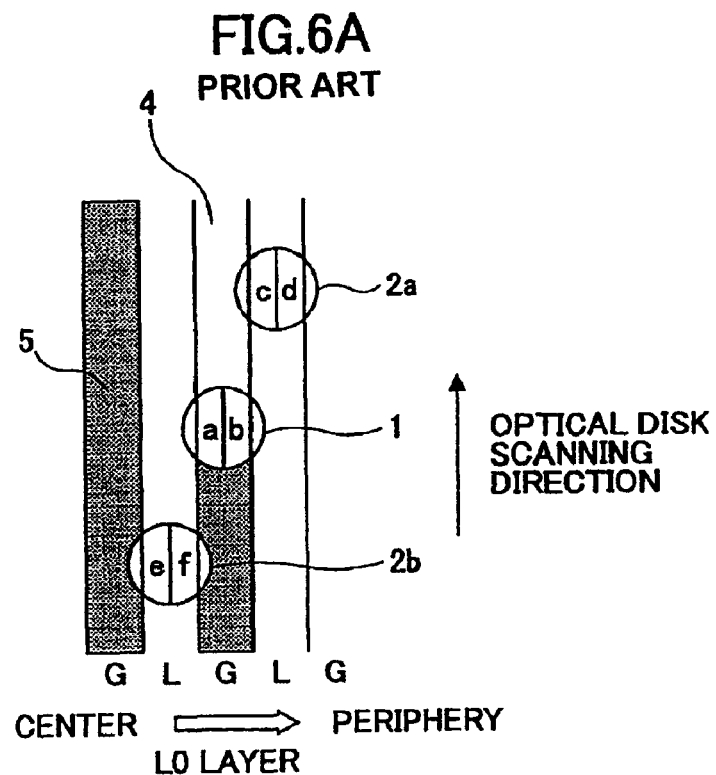
FIGS. 6A and 6B are diagrams each showing a conventional disposition of the main light beam and the sub light beams focused onto a recording surface of the multilayer information recording medium (double layer disk)

Here, for comparison, a description is given of the case of the conventional method. In the L0 layer of FIG. 6A, for example, the reflectivity of the second sub light beam 2b is increased because of the recorded part 5 on the recording surface. Letting the rate of increase of reflectivity at this point be r, SPP1' and SPP2' are given as follows:

$$SPP1' = \frac{(C-D)}{(C+D)} SPP1, \text{ and} \quad (17)$$

$$SPP2' = \frac{(rE-rF)}{(rE+rF)} = \frac{(E-F)}{(E+F)} = SPP2.$$

Accordingly, in the case where the main light beam 1 is focused into a spot on the center of a groove and each of the sub light beams 2a and 2b is focused into a spot on the center of a corresponding land on the recording surface of the double layer disk, the following equation holds.

MPP'=SPP1'=SPP2'=DPP=0. (18)

Thus, no offset is caused during recording, so that an excellent differential push-pull signal is obtained.

Figure 6B:
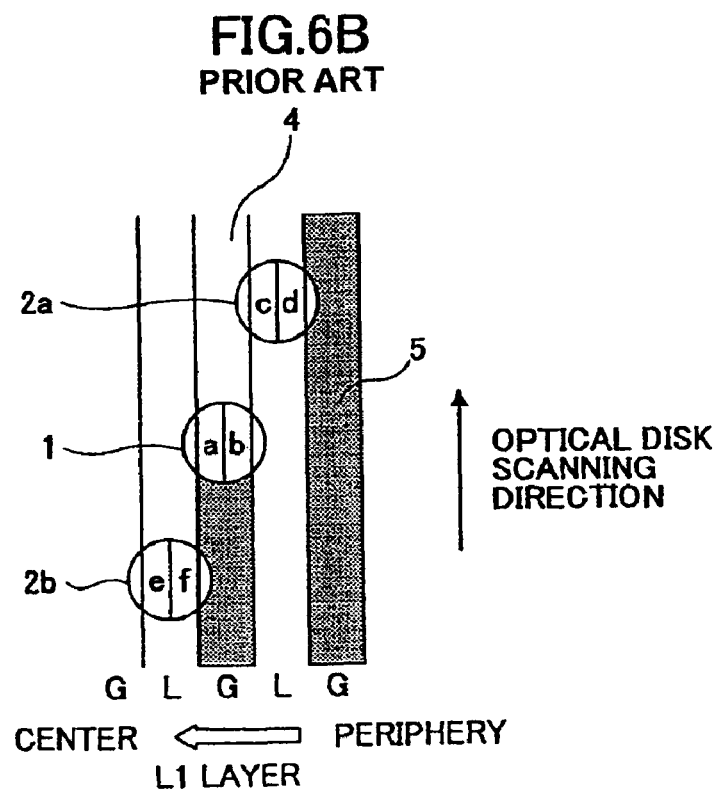

However, as shown in FIG. 6B, in the L1 layer, the reflectivity of the first sub light beam 2a on the periphery (outer) side and the reflectivity of the second sub light beam 2b on the periphery (outer) side are increased because of the recorded part 5 on the recording surface. Accordingly, letting the rate of increase of reflectivity at this point be r, SPP1' and SPP2' are given as follows:

$$SPP1' = \frac{(C-rD)}{(C+rD)}, \text{ and} \quad (19)$$

$$SPP2' = \frac{(E-rF)}{(E+rF)}.$$

Accordingly, the differential push-pull signal (DPP) includes an offset N(r) given as follows:

$$N(r) = -K\left(\frac{(C-rD)}{(C+rD)} + \frac{(E-rF)}{(E+rF)}\right). \quad (20)$$

Further, in the case of moving the optical pickup unit at high speed in a radial direction of the double layer optical disk, the objective lens 16 shifts because of its inertia. In order to eliminate the effect of this shifting, the shifting of the objective lens 16 is corrected using a lens position signal (an optical axis displacement component). Letting the lens position signal be LP, the lens position signal is given as follows:

$$LP = MPP + K \times SPP. \quad (21)$$

At this point, MPP and SPP are different in phase by 180°, and an offset due to optical axis displacement is caused in the same positive or negative direction in MPP and SPP. Accordingly, by setting the value of K to the ratio of light quantity of the main light beam 1 to the sub light beams 2a and 2b, MPP matches SPP in amplitude. As a result, an amplitude offset is canceled, so that only the optical axis displacement component is obtained as the lens position signal. This makes it possible to control the position of the objective lens 16 with accuracy.

Here, for example, in the L0 layer shown in FIG. 7A, the reflectivity of the second sub light beam 2b is increased because of the recorded part 5 on the recording surface. Letting the rate of increase of reflectivity at this point be r, SPP1' and SPP2' are given as follows:

$$SPP1' = \frac{(C-D)}{(C+D)} = SPP1, \text{ and} \quad (22)$$

$$SPP2' = \frac{(rE - rF)}{(rE + rF)} = \frac{(E-F)}{(E+F)} = SPP2.$$

Accordingly, in the case where the main light beam 1 is focused into a spot on the center of a groove and each of the sub light beams 2a and 2b is focused into a spot on the center of a corresponding land on the recording surface of the double layer disk, the following equation holds.

$$MPP' = SPP1' = SPP2' = LP = 0. \quad (23)$$

Thus, no offset is caused during recording, so that an excellent lens position signal is obtained.

Likewise, in the L1 layer shown in FIG. 7B, the reflectivity of the first sub light beam 2a is also increased because of the recorded part 5 on the recording surface. Letting the rate of increase of reflectivity at this point be r, SPP1' and SPP2' are given as follows:

$$SPP1' = \frac{(rC - rD)}{(rC + rD)} = \frac{(C-D)}{(C+D)} = SPP1, \text{ and} \quad (24)$$

$$SPP2' = \frac{(E-F)}{(E+F)} = SPP2.$$

Accordingly, in the case where the main light beam 1 is focused into a spot on the center of a groove and each of the sub light beams 2a and 2b is focused into a spot on the center of a corresponding land on the recording surface of the double layer disk, the following equation holds.

$$MPP' = SPP1' = SPP2' = LP = 0. \quad (25)$$

Thus, no offset is caused during recording, so that an excellent lens position signal is obtained.

Figure 11:
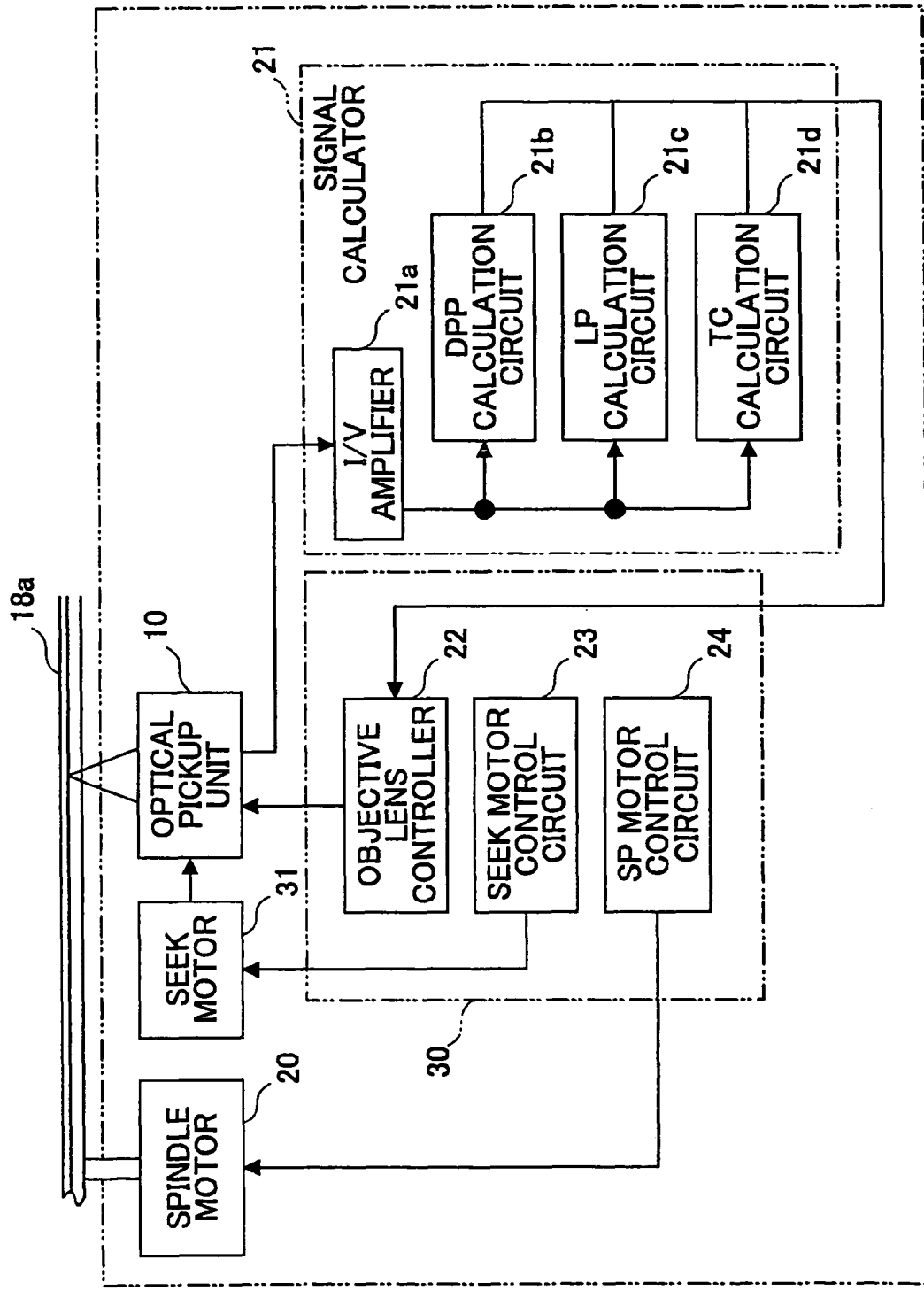
FIG. 11 is a block diagram showing an information recording apparatus according to a second embodiment of the present invention.

FIG. 11 is a block diagram showing an information recording apparatus according to a second embodiment of the present invention. Referring to FIG. 11, the double layer disk 18a has each of its recording surfaces rotated in the same direction by a spindle (SP) motor 20. An optical pickup unit 10 according to the present invention receives a main light beam and two sub light beams reflected from the double layer disk 18a on the above-described divided light receiving surfaces A through F of the divided light receiving elements 19a through 19c (FIG. 10). The received light beams are subjected to photoelectric conversion in the corresponding divided light receiving elements 19a through 19c so as to be output to a signal calculator 21. In the signal calculator 21, the outputs of the optical pickup unit 10 are converted into voltage values in I/V amplifiers 21a, and the voltage values are fed to each of a DPP calculation circuit 21b, an LP calculation circuit 21c, and a TC calculation circuit 21d. The DPP calculation circuit 21b generates the above-described differential push-pull signal (DPP). The LP calculation circuit 21c generates the above-described lens position signal (LP). The TC calculation circuit 21d generates a track cross signal (TC). These signals are fed to an objective lens controller 22 including a track controller controlling an objective lens in the track direction and a lens controller correcting the shifting of the objective lens. As a result, the objective lens is driven and controlled by a driver.

The information recording apparatus includes a control part 30 including the objective lens controller 22, a seek motor control circuit 23, and a spindle (SP) motor control circuit 24. The seek motor control circuit 23 controls a seek motor 31. The seek motor 31 moves the optical pickup unit 10 in the radial directions of the double layer disk 18a. The SP motor control circuit 24 controls the spindle motor 20.

In the case of performing recording on multilayer information recording media (double layer disks) using a dye material, an inorganic material, or a photosensitive material (photopolymer) for its recording layers, the difference in reflectivity between an unrecorded part and a recorded part tends to be greater. This is particularly so in the case of performing recording on write-once multilayer information recording media because information is always recorded in the unrecorded part. Therefore, according to one aspect of the present invention, a more stable signal can be obtained in the case of performing recording on such multilayer information recording media.

According to one aspect of the present invention, each sub light beam is disposed in the area of a recorded part where information has been recorded by a main light beam or in the area of an unrecorded part on a recording surface of a multilayer information recording medium. Accordingly, it is possible to obtain an excellent signal without a difference in reflectivity in each sub light beam.

According to one aspect of the present invention, tracking control can be performed stably on each recording surface of a multilayer information recording medium in which the direction of the spiral of a guide groove is different in each recording surface.

According to one aspect of the present invention, with respect to a multilayer information recording medium in which the direction of the spiral of a guide groove is different in each recording surface, it is possible to control the position of an objective lens at the time of a high-speed seek operation with respect to each recording surface.

According to an optical pickup unit and an information recording apparatus using the same according to the present invention, with respect to a multilayer information recording medium in which the direction of the spiral of a groove is different in each of its recording surfaces, excellent sub light beam signals may be obtained with respect to each recording surface. Further, an excellent differential push-pull signal, lens position signal, and track cross signal without an offset may be obtained with respect to each recording surface during recording even if there is a difference in reflectivity between an unrecorded part and a recorded part. As a result, it is possible to perform excellent control of the position of an objective lens so that information can be stably recorded on and reproduced from the multilayer information recording medium with accuracy. Thus, the present invention is useful for an optical pickup unit using the differential push-pull method detecting and controlling the position of a light beam emitted onto a recording surface of a multilayer information recording medium, and for an information recording apparatus using the optical pickup unit.

The present invention is not limited to the specifically disclosed embodiment, and variations and modifications may be made without departing from the scope of the present invention.

What is claimed is:

1. An optical pickup unit for recording information on and/or reproducing information from a multilayer information recording medium including a plurality of recording surfaces in each of which a guide groove serving as an information track on which the information is to be recorded is spirally formed, wherein a direction of a spiral of the guide groove alternates between the recording surfaces, the optical pickup unit comprising:

a light source emitting a light beam;
a diffraction element configured to split the light beam emitted from the light source into a main light beam and first and second sub light beams;
an objective lens for focusing the main light beam and the first and second sub light beams onto one of the recording surfaces of the multilayer information recording medium; and
a plurality of light receiving elements each divided into a plurality of light receiving parts shaped in any manner so as to receive the main light beam and the first and second sub light beams reflected from the one of the recording surfaces,
wherein the focused first and second sub light beams are disposed at respective positions at least 3/2 tracks away from the focused main light beam on the one of the recording surfaces, so as to satisfy a condition:

$$h\sin\theta \geq \left(n + \frac{1}{2}\right) \times 0.74 \, (\mu m),$$

where h is a distance between the focused main light beam and one of the focused first and second sub light beams on the one of the recording surfaces, θ is an angle formed by the information track and a straight line connecting the focused main light beam and the one of the focused first and second sub light beams on the one of the recording surfaces, and n is an integer greater than or equal to one.

2. An information recording apparatus, comprising:
an optical pickup unit as set forth in claim 1;
a signal processing part configured to generate, based on signals from the light receiving elements of the optical pickup unit, a main push-pull signal, which is a tracking error signal of the main light beam, a first tracking error signal of the first sub light beam, and a second tracking error signal of the second sub light beam; generate a sub push-pull signal by calculating a sum of the first and second tracking error signals; and generate a differential push-pull signal by calculating a difference between the main push-pull signal and the sub push-pull signal multiplied by a correction factor;
an objective lens controller configured to control the objective lens in a track direction based on the differential push-pull signal; and
a driver configured to drive the objective lens.

3. The information recording apparatus as claimed in claim 2, wherein the correction factor is a ratio of quantity of light of the main light beam to total quantity of light of the first and second sub light beams.

4. The information recording apparatus as claimed in claim 2, wherein a write-once multilayer information recording medium is used as the multilayer information recording medium which the information is recorded on and/or reproduced from.

5. An information recording apparatus, comprising:
an optical pickup unit as set forth in claim 1;
a signal processing part configured to generate, based on signals from the light receiving elements of the optical pickup unit, a main push-pull signal, which is a tracking error signal of the main light beam, a first tracking error signal of the first sub light beam, and a second tracking error signal of the second sub light beam; generate a sub push-pull signal by calculating a sum of the first and second tracking error signals; and generate a lens position signal by calculating a sum of the main push-pull signal and the sub push-pull signal multiplied by a correction factor;
a lens controller configured to correct a shifting of the objective lens based on the lens position signal; and
a driver configured to drive the objective lens.

6. The information recording apparatus as claimed in claim 5, wherein the correction factor is a ratio of quantity of light of the main light beam to total quantity of light of the first and second sub light beams.

7. The information recording apparatus as claimed in claim 5, wherein a write-once multilayer information recording medium is used as the multilayer information recording medium which the information is recorded on and/or reproduced from.

8. An optical pickup unit for recording information on and/or reproducing information from a multilayer information recording medium including a plurality of recording surfaces in each of which a guide groove serving as an information track on which the information is to be recorded is spirally formed, wherein a direction of a spiral of the guide groove alternates between the recording surfaces, the optical pickup unit comprising:

a light source emitting a light beam;
a diffraction element configured to split the light beam emitted from the light source into a main light beam and first and second sub light beams;
an objective lens for focusing the main light beam and the first and second sub light beams onto one of the recording surfaces of the multilayer information recording medium; and
a plurality of light receiving elements each divided into a plurality of light receiving parts shaped in any manner so as to receive the main light beam and the first and second sub light beams reflected from the one of the recording surfaces,
wherein the focused first and second sub light beams are disposed at respective positions at least 3/2 tracks away from the focused main light beam on the one of the recording surfaces, so as to satisfy a condition:

$$h\sin\theta \geq \left(n + \frac{1}{2}\right) \times 0.35 \, (\mu m),$$

where h is a distance between the focused main light beam and one of the focused first and second sub light beams on the one of the recording surfaces, θ is an angle formed by the information track and a straight line connecting the focused main light beam and the one of the focused first and second sub light beams on the one of the recording surfaces, and n is an integer greater than or equal to one.

9. An information recording apparatus, comprising:

an optical pickup unit as set forth in claim 8;

a signal processing part configured to generate, based on signals from the light receiving elements of the optical pickup unit, a main push-pull signal, which is a tracking error signal of the main light beam, a first tracking error signal of the first sub light beam, and a second tracking error signal of the second sub light beam; generate a sub push-pull signal by calculating a sum of the first and second tracking error signals; and generate a differential push-pull signal by calculating a difference between the main push-pull signal and the sub push-pull signal multiplied by a correction factor;

an objective lens controller configured to control the objective lens in a track direction based on the differential push-pull signal; and a driver configured to drive the objective lens.

10. The information recording apparatus as claimed in claim 9, wherein the correction factor is a ratio of quantity of light of the main light beam to total quantity of light of the first and second sub light beams.

11. The information recording apparatus as claimed in claim 9, wherein a write-once multilayer information recording medium is used as the multilayer information recording medium which the information is recorded on and/or reproduced from.

12. An information recording apparatus, comprising:

an optical pickup unit as set forth in claim 8;

a signal processing part configured to generate, based on signals from the light receiving elements of the optical pickup unit, a main push-pull signal, which is a tracking error signal of the main light beam, a first tracking error signal of the first sub light beam, and a second tracking error signal of the second sub light beam; generate a sub push-pull signal by calculating a sum of the first and second tracking error signals; and generate a lens position signal by calculating a sum of the main push-pull signal and the sub push-pull signal multiplied by a correction factor;

a lens controller configured to correct a shifting of the objective lens based on the lens position signal; and a driver configured to drive the objective lens.

13. The information recording apparatus as claimed in claim 12, wherein the correction factor is a ratio of quantity of light of the main light beam to total quantity of light of the first and second sub light beams.

14. The information recording apparatus as claimed in claim 12, wherein a write-once multilayer information recording medium is used as the multilayer information recording medium which the information is recorded on and/or reproduced from.

15. An optical pickup unit for recording information on and/or reproducing information from a multilayer information recording medium including a plurality of recording surfaces in each of which a guide groove serving as an information track on which the information is to be recorded is spirally formed, wherein a direction of a spiral of the guide groove alternates between the recording surfaces, the optical pickup unit comprising:

a light source emitting a light beam;

a diffraction element configured to split the light beam emitted from the light source into a main light beam and first and second sub light beams;

an objective lens for focusing the main light beam and the first and second sub light beams onto one of the recording surfaces of the multilayer information recording medium; and a plurality of light receiving elements each divided into a plurality of light receiving parts shaped in any manner so as to receive the main light beam and the first and second sub light beams reflected from the one of the recording surfaces, wherein the focused first and second sub light beams are disposed at respective positions 3/2 tracks away from the focused main light beam on the one of the recording surfaces, so as to satisfy a condition:

$h \sin \theta = 1.11 (\mu m)$, where h is a distance between the focused main light beam and one of the focused first and second sub light beams on the one of the recording surfaces, and θ is an angle formed by the information track and a straight line connecting the focused main light beam and the one of the focused first and second sub light beams on the one of the recording surfaces.

16. An optical pickup unit for recording information on and/or reproducing information from a multilayer information recording medium including a plurality of recording surfaces in each of which a guide groove serving as an information track on which the information is to be recorded is spirally formed, wherein a direction of a spiral of the guide groove alternates between the recording surfaces, the optical pickup unit comprising:

a light source emitting a light beam;

a diffraction element configured to split the light beam emitted from the light source into a main light beam and first and second sub light beams;

an objective lens for focusing the main light beam and the first and second sub light beams onto one of the recording surfaces of the multilayer information recording medium; and a plurality of light receiving elements each divided into a plurality of light receiving parts shaped in any manner so as to receive the main light beam and the first and second sub light beams reflected from the one of the recording surfaces, wherein the focused first and second sub light beams are disposed at respective positions 3/2 tracks away from the focused main light beam on the one of the recording surfaces, so as to satisfy a condition:

$h \sin \theta = 0.525 (\mu m)$, where h is a distance between the focused main light beam and one of the focused first and second sub light beams on the one of the recording surfaces, and θ is an angle formed by the information track and a straight line connecting the focused main light beam and the one of the focused first and second sub light beams on the one of the recording surfaces.

* * * * *